United States Patent
Czaja et al.

(10) Patent No.: US 7,353,039 B2
(45) Date of Patent: Apr. 1, 2008

(54) POWER CONTROL OF PLURAL PACKET DATA CONTROL CHANNELS

(75) Inventors: Stanislaw Czaja, Cardiff, CA (US); Hong Kui Yang, San Diego, CA (US)

(73) Assignee: VIA Telecom Co., Ltd. (KY)

( * ) Notice: Subject to any disclaimer, the term of this patent is extended or adjusted under 35 U.S.C. 154(b) by 504 days.

(21) Appl. No.: 10/455,783

(22) Filed: Jun. 5, 2003

(65) Prior Publication Data

US 2004/0043784 A1    Mar. 4, 2004

Related U.S. Application Data

(60) Provisional application No. 60/386,979, filed on Jun. 6, 2002.

(51) Int. Cl.
*H04Q 2/20* (2006.01)
*H04B 7/00* (2006.01)
*H04B 1/04* (2006.01)

(52) U.S. Cl. .............. 455/522; 455/69; 455/127.1

(58) Field of Classification Search ........... 455/522, 455/127.1, 69, 127.5, 226.1, 13.4, 515; 709/232; 370/311, 349, 252
See application file for complete search history.

(56) References Cited

U.S. PATENT DOCUMENTS

| | | | |
|---|---|---|---|
| 6,058,107 A | 5/2000 | Love et al. | 370/332 |
| 6,418,322 B1 | 7/2002 | Kim et al. | 455/522 |
| 6,463,296 B1 | 10/2002 | Esmailzadeh et al. | 455/522 |
| 6,480,481 B1 | 11/2002 | Park et al. | 370/342 |
| 6,717,924 B2* | 4/2004 | Ho et al. | 370/311 |
| 6,754,169 B2* | 6/2004 | Baum et al. | 370/204 |
| 7,023,824 B2* | 4/2006 | Khullar | 370/337 |
| 2002/0010001 A1* | 1/2002 | Dahlman et al. | 455/522 |
| 2003/0100267 A1* | 5/2003 | Itoh et al. | 455/69 |
| 2003/0202491 A1* | 10/2003 | Tiedemann et al. | 370/335 |
| 2003/0204615 A1* | 10/2003 | Wei et al. | 709/232 |
| 2003/0210664 A1* | 11/2003 | Achour et al. | 370/329 |
| 2003/0227882 A1* | 12/2003 | Czaja et al. | 370/329 |
| 2004/0203991 A1* | 10/2004 | Chen et al. | 455/522 |

FOREIGN PATENT DOCUMENTS

CN    1366441    8/2002

* cited by examiner

*Primary Examiner*—Tilahun Gesesse
(74) *Attorney, Agent, or Firm*—Jaquez & Associates; Martin J. Jaquez, Esq.; William C. Boling, Esq.

(57) ABSTRACT

A method and apparatus for enabling more efficient use of plural packet data control channels (PDCCHs) that are associated with a common block of one or more packet data channels in a cellular communication system capable of high-speed data communications. Mobile stations (MSs) within a coverage area of a base station (BS) are categorized in accordance with an expected ability to receive signal transmissions, by determining position, transmission path length, reported channel quality, required reverse transmit power, or otherwise. The plural PDCCHs are preferentially associated with different categories of MSs, and are transmitted at different levels of robustness. The most robust PDCCH reaches all served MSs, and another PDCCH is transmitted at a lower robustness for more efficient utilization. Power may be reduced, and/or data density increased, on a less robust PDCCH.

20 Claims, 5 Drawing Sheets

POWER CONTROL OF PLURAL PACKET DATA CONTROL CHANNELS

This application claims priority under 35 USC 119 to U.S. Provisional Application No. 60/386,979 filed Jun. 6, 2002 and entitled "Power Control for the TDM/TDM or TDM/CDM Control Channels for Multiuser CDMA Packet Data Channel," the contents of which are hereby incorporated in their entirety by reference.

BACKGROUND OF THE INVENTION

1. Field of the Invention

This invention generally relates to wireless communications, and more specifically to cellular telecommunications systems utilizing high speed packet data transfers.

2. Related Art

In CDMA telecommunications, the state of the art is substantially reflected in documents published by standardization bodies. The published standard that preceded the subject matter presented herein is IS-2000 Release B ("IS-2000 B"), which is hereby incorporated in its entirety by reference. According to that standard, CDMA cellular telecommunications devices may be enabled for high-speed packet data together with voice communication. An exemplary system and protocol for such services is an early step in the evolution of data-voice capabilities that may be referred to as 1xEV-DV, 1xEV-DV-enabled or simply "EV-DV." Devices so enabled shall include a number of different physical channels. Although the method and apparatus presented herein were developed in this context, those skilled in the wireless communications art shall recognize that the improvements are applicable to other systems as well. A salient characteristic of such systems is their ability to provide relatively high-speed packet data communications concurrently with voice communications.

As is well known, cellular communications systems generally employ portable transceivers, each of which is called a mobile station ("MS"), for user communications. Such systems are one-to-many in nature, and generally include a relatively modest number of base stations ("BSs") that each communicate with many MSs. The BSs are disposed as needed throughout geographical areas, to satisfy user demands for range and connection volume. For EV-DV services, or any cellular system providing high-speed pact data communications, the BS infrastructure must also satisfy user requirements for data volume.

Cellular systems are typically constrained in the range of frequencies over which they can operate, which in turn limits the number of MSs that each BS can service. The value of a base station depends upon the number of MSs that can be concurrently served by the base station at a given level of quality of service. Thus, there is a need to increase the number of MSs that a base station is capable of serving, within system constraints based upon bandwidth availability and quality of service requirements. Disclosed herein is a method and apparatus that may be implemented in a cellular telecommunication system to enhance the number of MSs that can be served concurrently by a base station of the system.

SUMMARY

A method and apparatus is described herein for more efficiently transmitting plural packet data control channels (PDCCHs) to a multiplicity of users sharing system packet data transmission resources. User mobile stations (MSs) concurrently served by a particular base station (BS) are evaluated for a proxy that reflects the ability of each MS to receive control channel messages, and categorized on that basis. Each of the plurality of PDCCHs is transmitted at a different level of robustness. Messages on the most robust PDCCH transmissions are preferentially directed to MSs in a category of relatively poor receivers, while messages on a less robust PDCCH may be directed to MSs in a category of relatively better receivers.

A number of different techniques may be employed to establish a proxy reflective of the expected ability of a particular MS to receive. These techniques may include, for example, any combination of estimating physical location within a cell served by a BS, estimating a transmission path length between the BS and the MS, evaluating a quality of transmissions from the MS received by the BS, and interpreting indications of received signal quality that are provided to the BS from the MS.

A number of different techniques may also be employed for reducing the robustness of transmissions from at least one of the plurality of PDCCHs. As one example, power levels may be reduced. Alternatively, or additionally, different modulation and/or coding techniques may provide extra bit capacity on at least one PDCCH. The PDCCH with increased bit capacity may then be subdivided, for example by TDM, CDM, or data sharing techniques, to provide messages to one or more additional MSs.

BRIEF DESCRIPTION OF THE DRAWINGS

Embodiments of the present invention will be more readily understood by reference to the following figures, in which like reference numbers and designations indicate like elements.

DETAILED DESCRIPTION

Overview

CDMA cellular telephone communications systems have in the past been primarily implemented for voice communications, but presently there is a desire to add reasonably high-speed data communications capability to such systems. In order to achieve effective high-speed data transmission together with voice transmission (referred to herein as "EV-DV"), a number of CDMA system features are being added or modified. For example, in order to increase overall data rates, several additional physical channels are provided in EV-DV-capable CDMA mobile station ("MS") transceivers to support high-speed packet data communication. Additionally, in order to enhance flexibility for delivering data to a multiplicity of users, the basic 20 ms frame structure of previous versions of CDMA protocol is being made controllable and addressable in "slots" having a duration of 1.25 ms.

Figure 1:
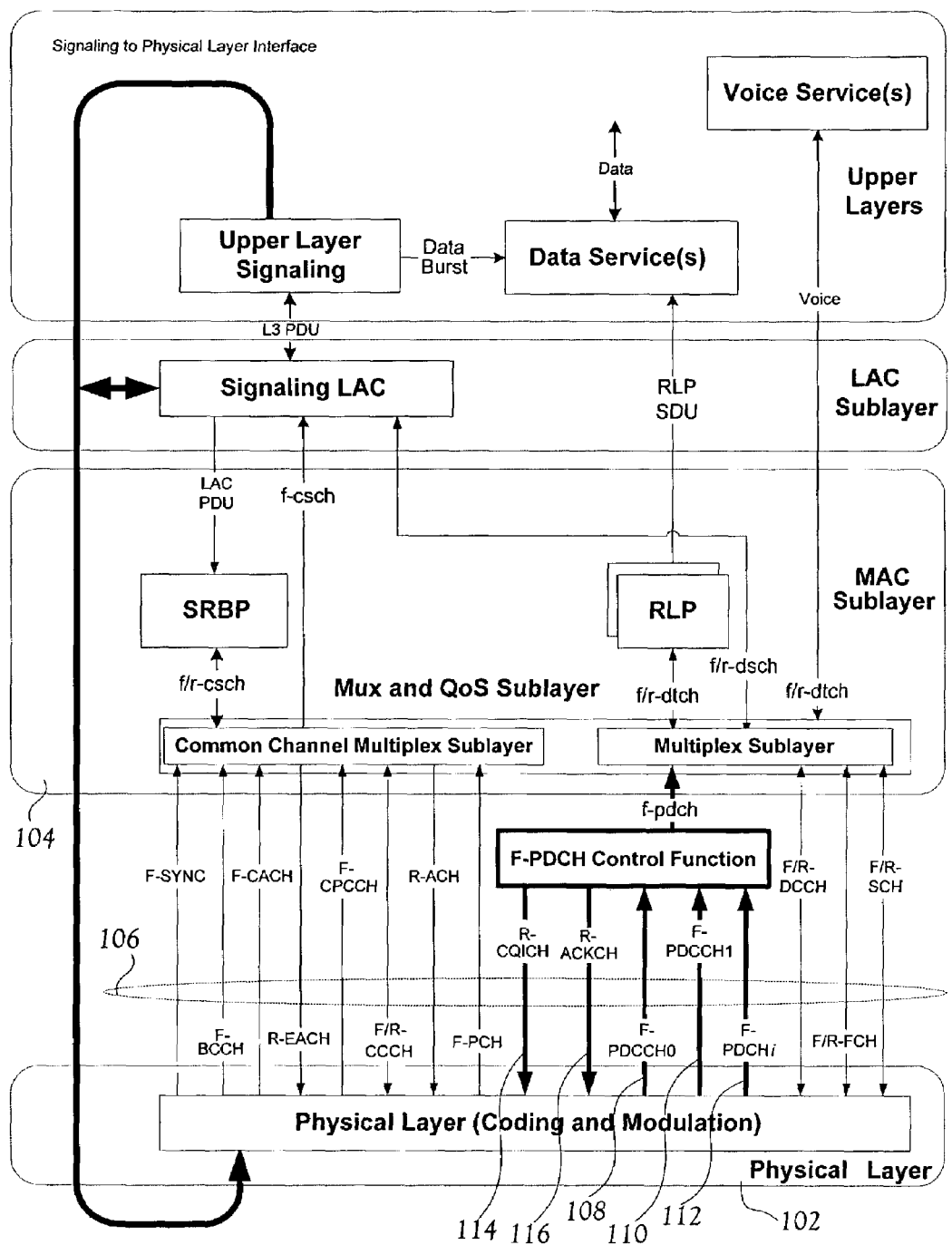
FIG. 1 is a block diagram of layer architecture for an exemplary data-voice (EV-DV) communication mobile station (MS) having multiple physical channels to facilitate high-speed packet data communications.

The physical channels added to support packet data capabilities include both forward and reverse channels. FIG. 1 illustrates an exemplary interface between a physical layer 102, and a medium access control ("MAC") layer 104, used by a CDMA EV-DV mobile station ("MS"). Each one of a set of physical channels 106 is indicated by an arrow with a channel label. The direction of the arrow indicates the direction of information flow for the particular channel: forward ("F") channels communicate information to the MS (into the MAC layer), while reverse ("R") channels communicate information from the MAC layer of the MS to a base station ("BS"). Some channels are bidirectional, indicated by double-ended arrows and "F/R" prefixed to the channel label.

Physical channels identified as components of a Forward Packet Data Control Function ("F-PDCF") include two forward packet data control channels ("F-PDCCHs" or simply "PDCCHs"), F-PDCCH0 108 and F-PDCCH1 110. The F-PDCCHs convey information from the BS to indicate, for example, whether a particular packet "belongs" to a target MS, and how the MS may decode data that it receives. The primary payload data channel is a forward packet data channel (F-PDCH) F-PDCHi 112. A F-PDCHi 112 assigned to the MS may be selected from among a plurality of such packet data channels that are available from the serving base station. A particular F-PDCHi (hereafter merely "PDCH") may be subdivided, and shared among a plurality of users. A MAC sublayer 104 of the MS is shown in a configuration in which it will receive packet data via the F-PDCHi 112. A Reverse Channel Quality Indication Channel ("R-CQICH") R-CQICH 114 provides feedback information, indicative of signal quality, from the MS to the serving BS. A Reverse Acknowledge Channel ("R-ACKCH"), R-ACKCH 116, is used by the MS to acknowledge correct receipt (ACK), or to indicate failure to receive a particular packet (NAK). These different physical channels may have very different bit rate capacities. For example, the packet data control channels F-PDCCH0 108 and F-PDCCH1 110 may convey only a few thousand bits per second ("bps"), while F-PDCH packet data channels may convey roughly 3 Mbps.

Cell Geography and MS Categorization

Figure 2:
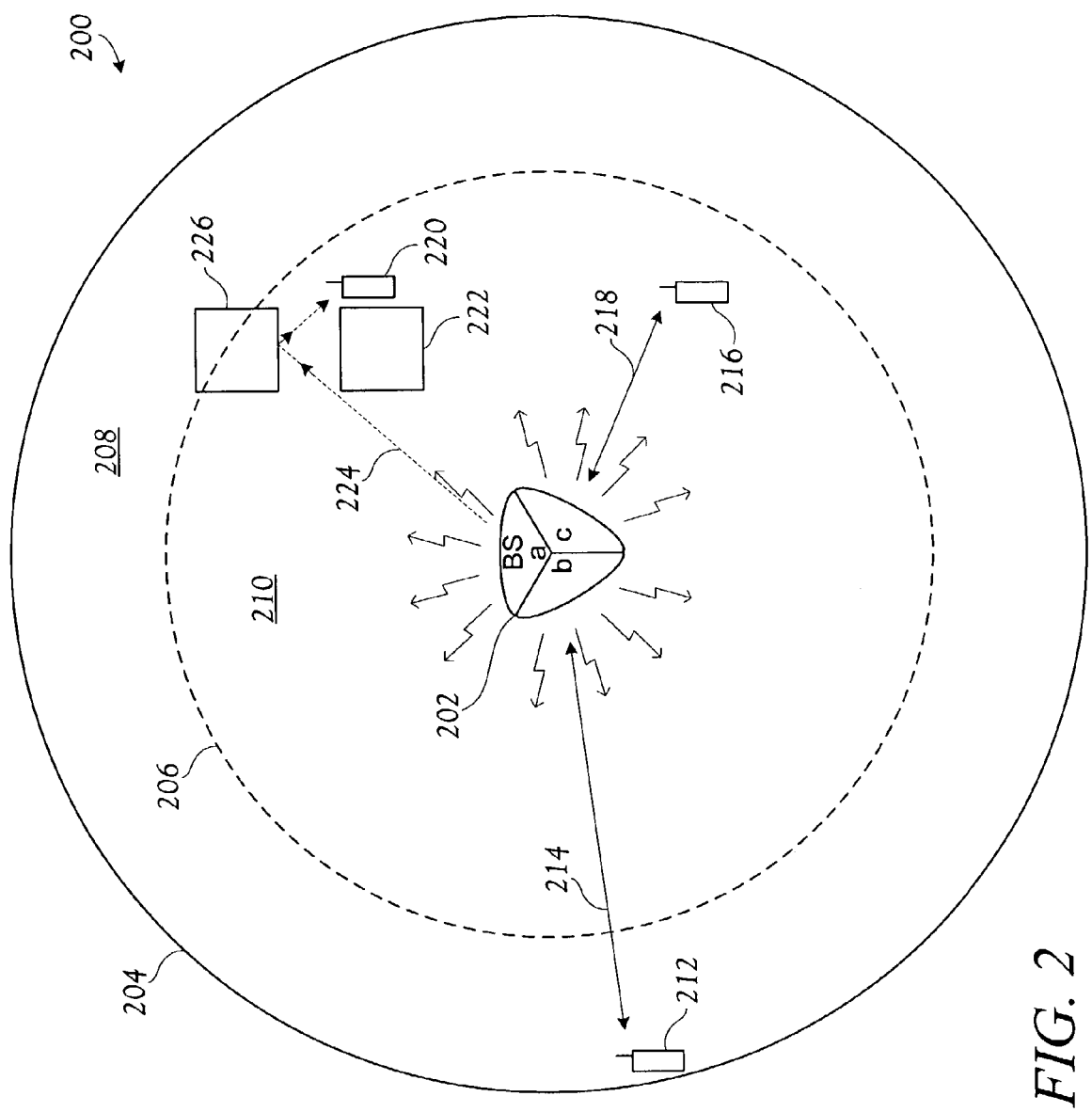
FIG. 2 is a simplified cell structure illustrating MS distribution in a cell served by sectors of a base station (BS), including sector-to-MS distance and path length.

FIG. 2 illustrates a hypothetical telecommunications cell 200 for a BS 202, which is a geographic area served by sectors a, b and c of the BS 202. A perimeter 204 for the cell 200 is defined by the range that the BS 202 is intended to serve. The cell perimeter 204 is illustrated as circular, though it may take other shapes depending upon geography, obstructions and interactions with other base station cells. The cell perimeter 204 may be assumed to be a cell radius $R_C$ away from the base station. The cell 200 may be divided, as indicated by a dotted divider line 206, into a more distant portion 208 and a closer portion 210. If MS density is constant throughout the cell 200, then half of the MSs within the cell 200 will be located within the more distant portion 208 if the divider line 206 has a radius of $2^{-0.5}R_C$, or about 71% of $R_C$.

Signals that are transmitted from the BS 202 are generally received by a MS at a strength that varies with the distance of the MS from the BS 202. The received signal strength (SS) generally declines as the inverse of D to a power X, (i.e. SS varies as $1/D^X$) where X is between 2 and 4, and where D is the distance of a MS from its serving BS.

In an exemplary CDMA EV-DV system, a plurality of PDCCHs is shared by all MSs that also share a corresponding PDCH. Moreover, receiving a PDCCH is necessary to enable a MS to receive data on the PDCH. Therefore, the PDCCHs are typically transmitted in a sufficiently robust manner to be correctly received by the most remote MS served by the serving BS for such PDCH. For example, as shown in FIG. 2, a MS 212 is located near the periphery of the cell 200, and has a distance 214 to the BS 202 of approximately $R_C$ (which is also a length of the signal path from the BS 202 to the MS 212). The PDCCH signal is typically transmitted from the BS 202 at a strength that permits MSs situated relatively distantly, such as the MS 212, to correctly receive messages on the PDCCH.

However, about half of the MSs served by the BS 202 are located inside the divider line 206. With respect to the BS 202, a MS 216 is located at a distance (and signal path length) 218 that has a value less than 0.707 $R_C$. Accordingly, if the PDCCHs are transmitted at constant amplitude, the PDCCH signal strength provided to approximately half of the served MSs is expected to be about $2^{1.5}$ (~2.8) times greater than the signal strength provided to the most distant served MSs. That is, if $SS(D)=k/D^3$, and $SS(R_C)=SS_0$, then $SS(R_C/2^{0.5})=2^{1.5} SS_0$. These relationships are not precise, but statistically it is expected that fully half of the recipients in a given cell will receive the PDCCH at a signal level that is about 2.8 times higher than is needed for reliably accurate reception.

MSs may be categorized in accordance with their expected ability to receive the PDCCH signals. Such categorization may be performed on the basis of location, which may be determined, for example, by GPS or trilateration techniques. An example of such categorization would be "near" MSs, such as the MS 216, that are roughly those MSs located in the near region 210 of the cell 200, and "distant" MSs, such as the MS 212, corresponding roughly to MSs located in the farther region 208 of the cell 200. After the MSs are categorized, advantage may be taken of the relatively higher signal strength experienced by MSs in a "near" category. PDCCH transmissions to the different categories may then be processed differently. For example, the strength of PDCCH signals that are directed to MSs in a "near" category may be reduced to less than half the strength of PDCCH signals that must reach all MSs in a "distant" category. Because PDCCHs are transmitted almost continuously, while voice channels to a particular MS are statistically transmitted about half of the time, reducing the power on a PDCCH channel by more than half should reduce overall transmission requirements enough to permit a given BS to service an additional voice channel. Thus, treating the MSs differently in regard to PDCCH transmissions, based on simple categorization techniques such as distance from a BS, can significantly increase a serving capacity of a BS.

A MS 220 is disposed inside the divider line 206 of the cell 200. However, direct signals from the BS 202 to the MS 220 are blocked by a large building 222. As such, a path 224 of signals to the MS 220 is indirect, reflecting off of another building 226. Thus, the length of the signal path 224 to the MS 220 is actually greater than the distance from the BS 202 to the divider line 206. An alternative technique for categorization, therefore, may be based upon a proxy for path length of signals to a particular MS, such as the MS 220. According to such a proxy, the MS 220 is categorized as a "distant" MS, whereas according to location estimation, the MS 220 might be categorized as a "near" MS. In an exemplary CDMA cellular communications system, the MS clock is locked to the serving BS clock as received by the MS. Accordingly, any reverse link transmission from the MS to the BS that is known to have been transmitted at a precise time according to the MS clock may be analyzed to estimate a signal round trip delay. This is accomplished by comparing a time of receipt at the BS of the reverse link transmission to the time expected for such receipt according to the BS clock.

If the building 222 did not completely block transmissions, then it is possible that the MS 220 would receive a signal directly from the BS 202, undelayed by the extra path length of the signal path 224. Signal path length, in that case, might suggest that the MS 220 belongs in a "near" category. However, the signal reaching the MS 220 might be substantially attenuated by traveling through the building 220. Therefore, further alternatives for evaluating the expected ability to receive signals, and for categorization of MSs, may be useful. Referring again to FIG. 1, an exemplary CDMA EV-DV system includes a R-CQICH 114 (reverse channel quality indication channel or simply CQICH) transmitted by each MS. In the exemplary system, a MS transmits a message on the CQICH during every timing slot, except that during a "control hold" state the transmission frequency may be reduced to as little as once per eight slots. The estimate of channel quality transmitted from each MS to the BS may thus be used as an alternative basis for evaluating MSs in order to determine their expected ability to receive signals, and to categorize them accordingly. For categorization purposes, a filtered result of channel quality indication values transmitted by the MS may be used, such as a running average of values from periods ranging from about 50 ms to 5 s, for example samples provided by the MS over a period of 100 ms.

In an exemplary CDMA system, a "reverse power" value is determined by a serving BS for each served MS. The BS transmits the reverse power value to the served MS to indicate an appropriate transmit power level at which the MS should transmit on reverse channels to the BS. Such a value is an example of another basis that may be used for evaluating current MS ability to receive. Also, in some systems it may be useful to determine an expected rate of travel of a served MS (for example, by measurement of a doppler shift in a pilot sequence as registered either by the MS or by a BS), in order to predict fading rates, and thus, more precisely categorize MSs for expected future receive quality.

Enhancing Efficiency for a PDCCH

Many approaches are possible for enhancing the efficiency with which at least one PDCCH is transmitted. The approaches range from simple techniques that are readily compatible with existing CDMA standards, to progressively more complex techniques that may need modifications to existing CDMA standards in order to be widely implemented. These techniques will be more readily understood in view of packet timing relationships between a shared PDCH and plural PDCCHs, as illustrated in FIGS. 3 and 4.

Figure 3:
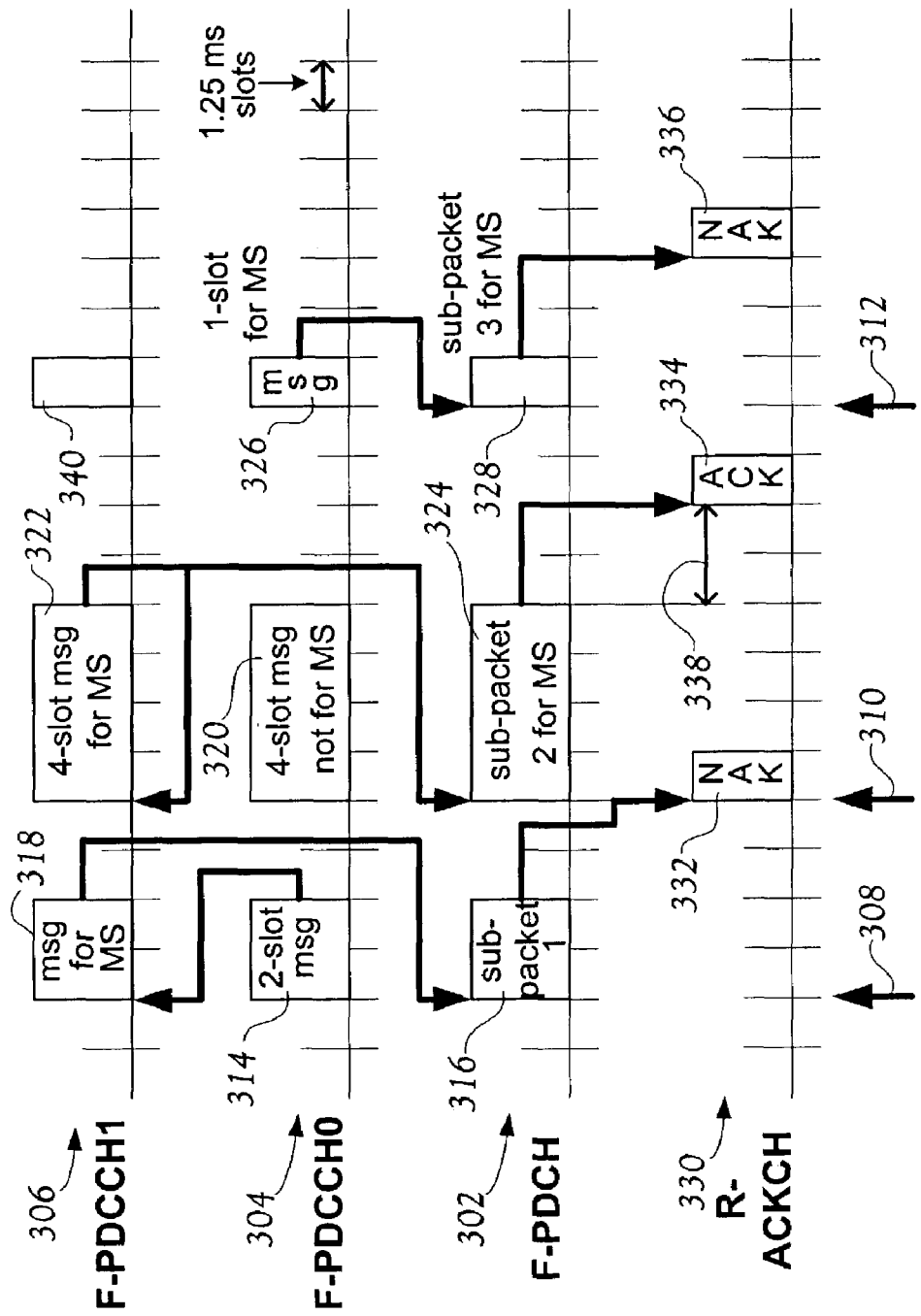
FIG. 3 is a time-slot timing diagram showing timing and possible interactions for packets transmitted between a BS and a MS in an exemplary CDMA cellular system.
Figure 4:
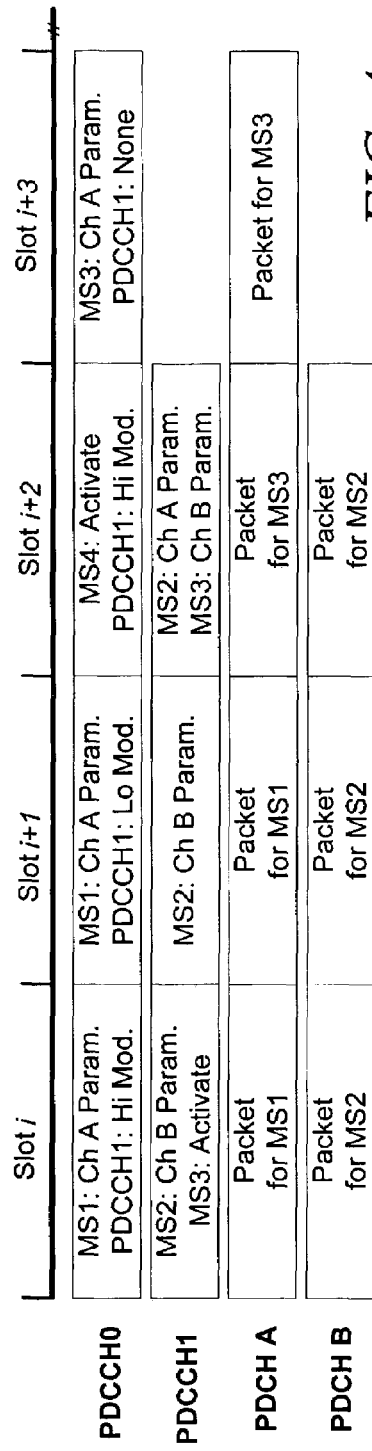
FIG. 4 is a packet sequence diagram for two control channels and a data channel shared between several users.

FIG. 3 illustrates relationships between packets on some of the channels that are provided for in an exemplary EV-DV CDMA communication system. In particular, timing and relationships are shown for a PDCH 302 that may be shared, and for two PDCCHs, PDCCH0 304 and PDCCH1 306 that are transmitted to MSs sharing the PDCH 302. When a subject MS is assigned to a PDCH, a Media Access Control (MAC) identifier, typically 8 bits, uniquely identifies the MS with respect to that assigned shared PDCH.

In order to provide concurrent access to the channel for a number of different MS receivers, PDCHs (such as the PDCH 302) are time division multiplexed (TDM). Using timing established by the pilot channel, each channel is conventionally divided into 1.25 ms slots. Active connections may be concurrently maintained for a large number of users, with each user receiving data from time to time. In addition to TDM, multiple MSs may be provided with concurrent access to the shared PDCH using code division multiplexing (CDM) techniques.

Data may be transferred in service data units (SDUs) having a selectable length of from one to four 1.25 ms time slots. At higher levels of system organization, data SDUs are typically sub-packets of a data Encoder Packet, but such higher-level organization is not significant for present purposes. Each SDU transmission begins at a transmission reference time $T_0$, such as reference times 308, 310 and 312. For convenience, a SDU on a PDCCH may be referred to as a "message," while SDUs on a PDCH will be referred to as data packets, or simply packets. Although the PDCCH messages are also "packets," the terminology reflects the fact that the primary packets for actual high-speed data transfer are the (F-)PDCH SDUs.

Beginning at the transmission reference time $T_0$ 308, for example, a message 314 occupying two physical time slots is transmitted on a the PDCCH0 304. A packet 316 (a first sub-packet of a higher level encoder data packet, as it happens) on the PDCH 302 begins at the same transmission reference time $T_0$ 308 and occupies the same two time slots. A message 318 is also transmitted on the second PDCCH, PDCCH1 306, and occupies the same time slots.

All overlapping SDUs on a PDCH and/or corresponding PDCCHs, in the exemplary CDMA system, conventionally use the same start time and duration, though this convention is by no means necessary. Thus, four-slot messages 320 on PDCCH0 and 322 on PDCCH1, together with a four-slot packet 324 on the PDCH 302, all begin at the transmission reference time $T_0$ 310 and have the same duration. Similarly, a one-slot message 326 begins at the transmission reference time $T_0$ 312, as does a corresponding one-slot data packet 328. The MS indicates success (ACK) or failure (NAK) to receive a data packet on a reverse acknowledgement channel (R-ACKCH or simply ACKCH) 330, which corresponds to item 116 in FIG. 1. An acknowledgement message, such as NAK 332, ACK 334 or NAK 336, is transmitted after a delay 338, typically equal to two time slots, during which the MS can determine whether or not the relevant packet has been successfully decoded. Only packets that are relevant to a particular MS are illustrated in FIG. 3, and it may be assumed that messages and packets are being transmitted to other MSs during time slots when nothing is shown in FIG. 3. However, packets need not necessarily be transmitted on both PDCCHs. For example, because the message 326 provides information that directs the MS to decode the packet 328 on the PDCH 302, and because no other MS is receiving data during that message slot, it is possible that no message is transmitted on PDCCH1 306 during the period indicated by designator 340.

In an exemplary CDMA EV-DV system, information to direct and enable decoding of a packet on the PDCH is obtained from a message that is transmitted concurrently on a PDCCH. One or both of the PDCCHs must generally be completely decoded in order to obtain correct instructions for decoding a PDCH packet. In FIG. 3, the bold arrow that extends from the right end of the message 318 to the beginning of the PDCH SDU 316 illustrates that information in the message 318 is used to interpret the SDU 316. However, demodulating and decoding PDCCH1 may require a decision regarding the appropriate modulation and coding scheme (MCS) for this task. According to one approach, information may be obtained from SDUs that previously have been decoded to determine the appropriate MCS for a SDU that has not yet been demodulated and decoded. The bold arrow extending from the right end of the PDCCH0 message 314 to the beginning of the PDCCH1 message 318 illustrates one exemplary technique for making this decision, in which the message decoded on PDCCH0 contains an instruction as to the correct MCS for decoding a concurrent message on PDCCH1. The message decoded on PDCCH0 may also contain further information, such as whether PDCCH1 need be processed at all. According to variations of this technique, relevant instructions (e.g., identifying the correct MCS) may be obtained not from a concurrent SDU on PDCCH0, but from a message previously transmitted on either PDCCH0 or PDCCH1. These techniques obtain information from a SDU that previously has been decoded to determine how to decode a SDU that has not yet been decoded.

An alternative approach uses a trial and error method to determine which MCS to use in order to demodulate and decode the PDCCH1, rather than relying upon information from a previously decoded SDU. The arrow extending from the end of the PDCCH1 SDU 322 to the left side or beginning of the same SDU illustrates such a trial and error approach. The SDU 322 is decoded according to a first MCS. If the resulting message proves valid (as determined, for example, by a successful cyclic redundancy check), then the message may be utilized for decoding the data packet 324. This is indicated in FIG. 3 by the arrow extending to the beginning of the packet 324. However, if the resulting message proves invalid, then a different MCS is selected, and processing returns to the beginning of the SDU 322.

Steps may be taken to reduce the probability that the first MCS is incorrect. First, for example, the universe of MCSs that are allowed to process the SDU 322 may be limited to a small number, such as two or three, by convention. The universe of allowable or expected MCSs should be known to the receiving MS. Second, the first MCS may be selected on the basis of the MCS that most recently successfully decoded a SDU on PDCCH1. Third, the MCS that successfully decoded the largest number of PDCCH1 SDUs during a preceding time period may be selected as the first MCS. These and many other techniques may be utilized to reduce the power that is expended by incorrectly demodulating and decoding PDCCH1 SDUs.

FIG. 4 illustrates a sequence of packet slots i to i+3, without regard to the number of 1.25 ms time slots allocated to each. There is no loss of generality, as long as all PDCH packets and PDCCH messages in a particular packet slot have the same time duration. This is conventional in the exemplary CDMA DV-EV system. Rather than presenting only SDUs that are relevant to a particular MS, as in FIG. 3, FIG. 4 illustrates information relevant to several MSs that may be transmitted on either a PDCCH0 or a PDCCH1, or on a PDCH which may be shared as a PDCH A and a PDCH B. In the exemplary CDMA EV-DV system, the two channels PDCH A and PDCH B are individually derived for each packet-slot by code division multiplexing of the PDCH. Of course, other implementations may use TDM, or other multiplexing techniques, for purposes of generating the two (or more) PDCH channels.

Conventionally, PDCCH0 is the control channel that every MS should be capable of receiving. Global messages may be conveyed on PDCCH0, such as restrictions upon the Walsh space available to any users of the PDCH. Thus, PDCCH0 is treated as a primary PDCCH0 that must be received by MSs categorized as "far," i.e., relatively poor receivers. Control messages to such "distant" receivers may be preferentially transmitted on PDCCH0. FIG. 4 indicates that during packet slot i, a message on the PDCCH0 channel includes a MAC address for MS1, which has been categorized as a "distant" MS. The message includes information that enables MS1 to demodulate and decode a packet on channel PDCH A. In addition to specifying the modulation scheme and coding for the data packet on PDCH A, the message on PDCCH0 may also specify which portion of the Walsh space available for the shared PDCH constitutes the channel PDCH A.

The PDCCH0 message in packet slot i may also include certain information regarding PDCCH1 that may facilitate efficient use of PDCCH1. This is particularly true when the information in PDCCH1 is directed to one or more MSs (such as MS2 and MS3) that have been categorized as "near," or able to receive signals relatively well. For example, the PDCCH0 message of packet slot i may indicate that PDCCH1 employs a modulation and/or coding scheme that provides a substantially higher data density than is provided on PDCCH0. After decoding PDCCH0, MS2 and MS3 can demodulate and decode PDCCH1 accordingly, because they are able to receive signals relatively well. Due to the higher data density, PDCCH1 may be multiplexed to provide MAC IDs and messages for both MS2 and MS3. In particular, PDCCH1 may convey the appropriate parameters, such as modulation scheme, coding and Walsh space allocated to PDCH B, so that MS2 can demodulate, decode and obtain the data from PDCH B. The message on PDCCH1 may also convey a MAC address and message directing MS3 to transition from a control hold (i.e., reduced communication) state to an active state, so that MS3 is ready to receive data in a subsequent packet slot.

Any appropriate technique may be employed to multiplex the message on PDCCH1 to serve two MSs. For example, the message may be time subdivided into two distinct packets. Alternatively, the header may identify a portion of the message payload that is intended for one MS, and it may also specify the MAC address of another MS (e.g., MS3) to direct a portion of the payload to such other MS. A special header may be employed with high modulation messages. However, the header need not be modified to incorporate a second MAC address. Instead, the MAC address of the second MS that is serviced (e.g., MS3) may be disposed in the payload, for example at a known position following the header, or at a known position following that portion of the payload that is assigned to MS1. Many other techniques are possible. For example, if PDCCH1 comprises more than one code space, then CDM techniques may be employed. In accordance with the information in the packet slot i message on PDCCH0, MS1 obtains data from PDCH A, while MS2 obtains data from PDCH B in accordance with the information provided in the concurrent message on PDCCH1.

Turning next to packet slot i+1 in FIG. 4, the message on PDCCH0 may provide parameters that define PDCH A, as well as directing and enabling MS1 to demodulate and decode a data SDU on PDCH A. The same PDCCH0 message also indicates that PDCCH1 is transmitted with a modulation and coding scheme (MCS) that provides relatively low data density, for example the same MCS as utilized with PDCCH0. Low data density is sufficient in this instance, because PDCCH1 need only provide a single message (i.e., a message conveying parameters that enable MS2 to define, demodulate and decode PDCH B). However, because MS2 is categorized as a "near" or high-receiving MS, the BS may accordingly reduce the robustness of PDCCH1 transmissions by reducing a power level at which PDCCH1 is transmitted. For simplicity, the amount by which the power is reduced may be roughly based upon the characteristics of a broad "near" category in which MS2 has been placed. Alternatively, MS2 may be placed in one of a number of narrower, more refined categories, and the power at which the Slot i+1 message is transmitted on PDCCH1 may be reduced commensurate with the receiving capability of MSs in such a more refined category. In accordance with the information in the packet slot i+1 message on PDCCH0, MS1 obtains data from PDCH A, while MS2 obtains data from PDCH B in accordance with the concurrent PDCCH1 message.

In the example shown in FIG. 4, MS 4 has been categorized as a "distant" MS. Accordingly, in packet slot i+2, the highly robust message on PDCCH0 includes directions for MS4 to transition from a reduced communication (e.g., control hold) state to an active state. The bandwidth available for the PDCH still needs to be shared, however, so the PDCCH0 message also indicates that PDCCH1 is modulated/coded with a high data density. MS2 and MS3 have been categorized in the example of FIG. 4 as "near" MSs. Accordingly, the high-density message on PDCCH1 provides the appropriate parameters and instructions for MSs 2 and 3 to decode PDCH A and PDCH B, respectively.

In packet slot i+3, all of the bandwidth available for the shared PDCH is assigned to a data packet for MS3. Because no bandwidth (or code space) remains after the allocation to PDCH A, PDCH B does not really exist in this slot. Moreover, no other messages need be conveyed by the PDCCHs. Therefore, the PDCCH0 message in packet slot i+3 may be directed to a "near" MS, MS3. An indication may also be provided that PDCCH1 is not being transmitted at all. PDCH A is demodulated and decoded by MS3 in accordance with the message on PDCCH0.

Base Station Transmitter

Figure 5:
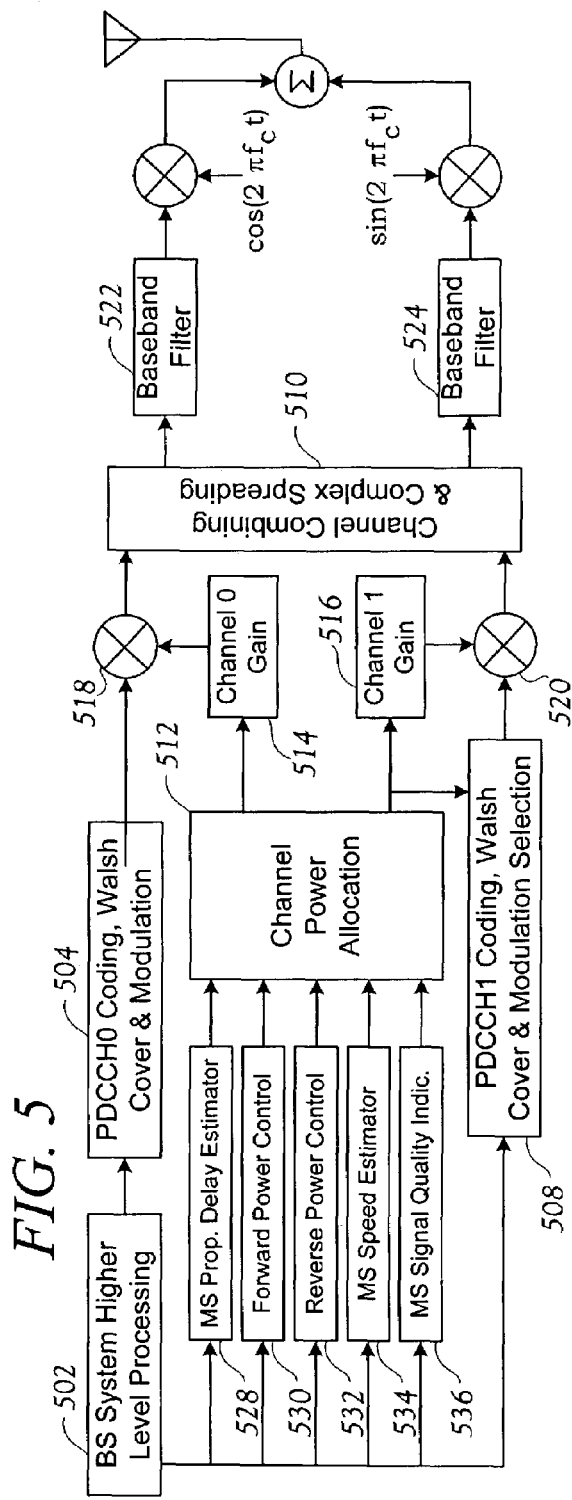
FIG. 5 is a block diagram of elements of an exemplary transmitting BS.

FIG. 5 illustrates apparatus that may be provided for efficiently utilizing a plurality of PDCCHs in a BS transmitter system. Higher level processing facilities 502 for a BS transmitting system may be configured to evaluate MSs served by the system. The higher level processing facilities 502 may be used to predict a probable ability of each MS to receive signals, and may categorize the MSs in two or more categories accordingly. Referring to a category of MSs less able to receive signals as "distant" MSs, and a category of MSs more able to receive signals as "near" MSs, the BS system higher level processing block 502 may be configured to preferentially direct that PDCCH messages for "distant" MSs be prepared in a F-PDCCH0 symbol preparation block 504 for transmission via the PDCCH0. The higher level processing block 502 may also be configured to preferentially direct that PDCCH messages for "near" MSs be prepared in a PDCCH1 coding, Walsh cover and modulation selection block 508, for transmission via PDCCH1.

A channel power allocation block 512, operating in conjunction with the BS higher level processing block 502, may be configured to direct channel gain for each packet slot, controlling a gain value for PDCCH0 in a block 514, and a gain value for PDCCH1 in a block 516. The gain value in the block 514 is applied to the coded, Walsh covered and modulated symbols from the coding, Walsh cover and modulation block 504 by means of a multiplier 518. Channel gain set in the block 514 will generally be sufficient to ensure that the most remote MSs served by the BS system are able to correctly receive PDCCH0. This value may be fixed or variable.

Channel gain set in the block 516 may be applied, through a multiplier 520, to signals prepared by a PDCCH1 coding, Walsh cover and modulation selection block 508. The coding and/or the modulation for PDCCH1 symbols may be fixed, or may optionally be selectable. The PDCCH1 gain set in the block 516 may, in many instances, be set to a lower value than the value set for PDCCH0 in block 514. In one embodiment, channel gain in the block 516 may be consistently set to a value equal to less than half of the gain set in the block 514, particularly if a multiplexing and coding scheme (MCS) selected in a block 508 matches the MCS of PDCCH0. In this embodiment, only relatively rare circumstances will create a need for the block 516 to increase the gain applied to PDCCH1 to a level that is more than half of the gain applied to PDCCH0. Such circumstances may arise, for example, when both PDCCHs need to transmit concurrent messages to two "distant" MSs. Accordingly, most PDCCH1 transmissions are made at substantially less power than are PDCCH0 transmissions. By thus reducing the robustness of the PDCCH1 transmission through reduced power, transmit power is used more efficiently, leaving more effective bandwidth for other transmissions.

The channel power allocation block 512 may optionally control the coding and or the modulation selected in the PDCCH1 coding, Walsh cover and modulation selection block 508, as well as the gain setting of the block 516. By doing so, the BS system may be configured to vary either or both of the channel gain and the symbol density transmitted on PDCCH1, thereby being enabled, for example, to serve two "near" MSs with a single PDCCH1 message block, as illustrated in FIG. 4, described above. An indication of the MCS selected in the block 508 may be provided in the concurrently transmitted PDCCH0 SDU. Such an indication in PDCCH0 may facilitate identification, at the receiving MS, of the MCS utilized by transmissions on PDCCH1. However, the MCS for PDCCH1 may be made selectable between two or more levels without a need for such notification. Instead, each MS that is not addressed in PDCCH0 may "blind decode" PDCCH1 messages using a first MCS, and if such blind decoding fails an accuracy check, may then decode using a different MCS. Such a procedure is simple for a relatively small number of allowable MCS levels. For example, two such MCS levels may be allowed for use with PDCCH1, a first MCS level comparable to the MCS used by PDCCH0, and a second MCS level that provides approximately double the data density provided by the first MCS level (at a commensurately reduced level of signal robustness for a given transmission power level). One embodiment provides two such MCS levels together with two or more channel gain levels.

Gain is controlled for the coded and modulated symbols of PDCCH0 and PDCCH1 in the multipliers 518 and 520 respectively, and the resulting signals may then enter a block 510 to be combined to form a single complex signal. In an exemplary CDMA system, the complex signal may also be spread in the block 510. After combination and complex spreading, the I and Q components of the complex signal produced by the block 510 may proceed through baseband filters 522 and 524, respectively. After baseband filtering, the complex signals of the combined PDCCH0 and PDCCH1 symbols are multiplied by the appropriately phase-shifted version of the carrier frequency, summed, and output to a transmit antenna. Further RF hardware may be provided in the signal path before the antenna, for example, to provide a second stage of frequency shifting, and/or to provide further RF gain.

The channel power allocation block 512 may be configured to select channel gains based upon one or more of a variety of inputs provided by the BS higher level processing block 502. The inputs may include, for example, one or more of the following: estimates of MS signal path length derived from signal transmission time estimates produced by a MS propagation delay estimator block 528; forward voice channel power control estimates produced by a forward power control block 530; reverse power control values prepared for transmission to each MS in a reverse power control block 532; predictions of fading of the MS signal due to an estimated speed of the MS, produced by a MS speed estimator block 534 on the basis, for example, of Doppler shift estimates; and/or averaged values of received signal quality (such as C/I) as reported by each MS and processed in a MS reported signal quality block 536. Location estimates for MSs, based, for example, upon trilateration using either GPS satellite signals or signals between the MSs and a plurality of BSs, may also be employed. Any combination of these inputs may be used to establish a value or "proxy" that reflects an expected ability of each served MS to receive signals accurately. The served MSs may then be categorized into two or more categories based upon such proxy.

Mobile Station Receiver

Figure 6:
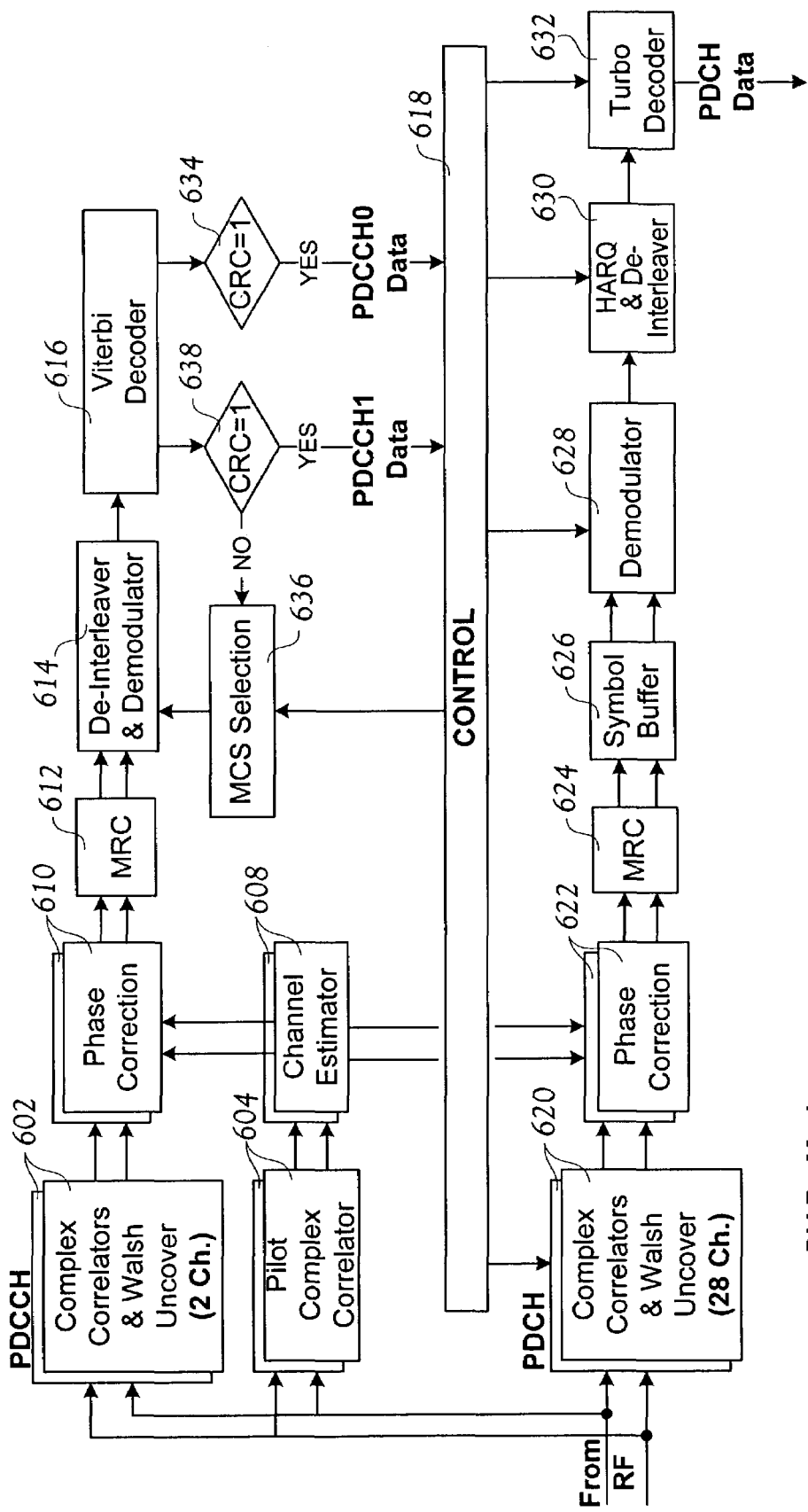
FIG. 6 is a block diagram of receiver signal processing hardware for an exemplary EV-DV mobile station.

FIG. 6 is a simplified block diagram illustrating receive processing hardware for a plurality (as illustrated in FIG. 6, two) of PDCCHs, a PDCH (using up to 28 Walsh spaces), and a pilot signal. Double lines are shown whenever the signal is in a complex (I & Q) form. The incoming signal (labeled "From RF" in FIG. 6) is received from a RF section, not shown, and includes I & Q samples at the chip rate. Three blocks receive the raw sampled signal, including a PDCCH complex correlator block 602, a pilot complex correlator block 604, and a PDCH complex correlator block 620. Each of these complex correlator blocks is shown as a plurality of blocks, stacked or superimposed, to indicate the typical presence of two or more instances, or "fingers," of each block. The plurality of complex correlator fingers acts as a rake filter to separately process copies of signals that are slightly separated from each other in time. The time separations between copies may be due to natural multi-path reflections, or may be intentionally created using transmit diversity techniques. The number of fingers provided is an engineering design choice for each receiver design. The pilot complex correlation block 604 receives the complex signal and, for each finger, despreads it against the appropriate pilot PN code. The results of the pilot correlator for each finger are provided to a corresponding finger of a channel estimator block 608. The channel estimator block 608 provides channel estimates, which generally differ for each finger, to be used for both the PDCCH and PDCH channels. Each use of stacked blocks in FIG. 6 illustrates a similar typical employment of multiple distinct processing fingers.

Two PDCCH channels are shown, PDCCH0 and PDCCH1, which comports with an exemplary CDMA EV-DV system, though the number of PDCCH channels is a matter of design choice and standard convention. Accordingly, two channels of complex correlation and Walsh symbol despreading are provided in each finger of the block 602. The complex I and Q symbols output from each finger of the complex correlator block 602 are provided to a corresponding finger of a phase correction block 610 for phase correction, based upon input received from the corresponding finger of the channel estimator block 608. After phase correction, symbols derived from each finger are provided to a Maximum Ratio Combiner (MRC) 612 that operates to appropriately combine the outputs from all fingers to produce a single symbol stream. Accordingly, the MRC 612 is indicated as a single block, rather than as a plurality of fingers. In order to better understand interactions within the PDCCH processing blocks that are subsequent to the MRC block 612, a brief description of the PDCH receive processing is set forth below.

Similarly to the PDCCH signal path, the PDCH signal path also typically includes plural fingers of a complex correlator block 620 and of a phase correction block 622, one for each receiver rake finger. Compared to PDCCH processing, however, PDCH processing is typically capable of performing at a much higher bit rate, because the PDCH is provided with more Walsh space and a wider selectable range of modulation and coding techniques. In an exemplary system, each finger of the correlator block 620 includes 28 complex correlators that may be employed concurrently to perform Walsh symbol despreading, as compared to the two complex correlators used by the two PDCCHs illustrated in FIG. 6. Complex symbols from each finger of the correlator block 620 are provided to a corresponding finger of the phase correction block 622 for phase correction in response to information from the corresponding fingers of the channel estimator 608. From the various fingers of the phase correction block 622, complex symbols are provided to a MRC block 624, where they are appropriately recombined. Complex symbols are output from the MRC block 624 and are stored in a symbol buffer 626. The symbol buffer 626 stores complex, undemodulated symbols for up to five slots.

The modulation applied to the PDCH symbols at the transmitter may vary widely, ranging, for example, from QPSK to 16 QAM, or higher. The demodulator block 628 is not provided with advance notice of the modulation scheme used by the signal. Accordingly, demodulation of the buffered symbols does not commence until the demodulator block 628 receives demodulation instructions from the control block 618. The control block 618, in turn, obtains the demodulation level from a message packet concurrently received on a PDCCH. The demodulated symbols output by the demodulator block 628 are provided as input to a block 630 for de-interleaving. The block 630 also provides hybrid ARQ (automatic request for retransmission). Similarly to the demodulator block 628, a decoder block 632 is provided information from the control block 618, for example, in regard to a packet size, and applies Turbo-decoding to the de-interleaved symbols output by the block 624. PDCH data is thereby produced.

A primary purpose of the PDCCHs is to provide information to the demodulator block 628 and the decoder block 632 that enables the PDCH data packet to be processed. Conventionally, the demodulation level cannot be obtained from a message on a PDCCH until the entire message has been received and despread, demodulated, de-interleaved and decoded. The PDCH symbols, therefore, cannot be demodulated, let alone decoded, until a complete PDCCH message packet has been completely interpreted. Accordingly, the symbol buffer 626 stores symbols for a period of time that is greater than the maximum packet length (which is typically four slots). Therefore, the symbol buffer 626 typically provides sufficient complex storage for the maximum number of symbols that can be transferred in five slots.

The need for information from one of the PDCCHs to complete processing of the PDCH returns the focus to the PDCCH receive processing path. Several alternatives are discussed for processing after the MRC block 612, particularly in respect of processing PDCCH1.

PDCCH0 may, by convention, be modulated and coded using a predetermined modulation and coding scheme (MCS) that is known to the receiver. Symbols from the MRC 612 may therefore proceed immediately through the de-interleaver and demodulator block 614, and through the Viterbi decoding block 616. The resulting bits may be checked for validity with a cyclic redundancy check at a block 634. If valid, the resulting bits may proceed to the control block 618, from which they may be used to complete processing of a PDCH data packet, at least if the PDCCH0 message is addressed to the illustrated receiver. The CRC block 634 may comprise any validity check, such as error checking and correction, or mere checksum. If invalid, the message is ignored, and decoding is attempted for a different message. Use of a predetermined and robust MCS creates a high probability that even a "distant" MS can correctly decode all PDCCH0 messages.

PDCCH1 processing, however, may proceed according to any number of alternatives that permit a plurality of different MCSs to be used with PDCCH1, rather than using a constant, predetermined MCS. According to some "plural PDCCH1 MCS" alternatives for processing PDCCH1, a plurality of modulation and coding schemes (MCSs) may be applied to PDCCH1 transmissions. Thereby, if the MS is in a good reception area, it can receive more data on PDCCH1 even though the data is sent as a less robust, but denser, signal. In order to permit alternative demodulation and decoding, complex symbols may be required for at least PDCCH1 (as indicated by the double arrows from the phase correction block 610 to the MRC block 612, and from the MRC block 612 to the de-interleaver and demodulator block 614 in FIG. 6).

According to a first of these "plural PDCCH1 MCS" alternatives, the receiving MS is informed in advance, for example by standards convention, that the MCS for PDCCH1 is to be selected from among a small group of MCSs, such as two or three, each of which is known in advance to the MS. According to this first alternative, processing of PDCCH1 proceeds in the block 614, after de-interleaving, with "blind" demodulation according to a default MCS. The default MCS may be fixed, or it may be determined in a MCS selection block 636 according to criteria that may be obtained from the control block 618. Examples of default MCSs that may be determined according to such criteria include the following: the most recently used MCS, a randomly selected MCS, a conventionally dictated MCS, or the MCS successfully used most frequently in the recent past. After blind demodulation is performed, blind decoding is also performed, according to the default MCS, in the decoder block 616. The resulting PDCCH1 is evaluated next for validity at a validity check block 638. Any convenient validity checking technique may be employed in addition to, or instead of, the indicated CRC check. If the PDCCH1 message is valid, the message is provided to the control block 618 for use in processing the PDCH according to the address and instructions in the message. However, if the validity check fails, then a different MCS is selected by the MCS selection block 636. Using the symbols that are still stored in the de-interleaver memory, blind demodulation and decoding proceeds with the different MCS. Upon success, the PDCCH1 message data is passed to the control block 618. Upon further failure, the system may try further MCSs that are among those expected. When all expected MCSs have been tried, the MCS selection block 636 may terminate the processing.

According to a second of the "plural PDCCH1 MCS" alternatives, the receiving MS is directed by the PDCCH0 message in regard to the appropriate MCS for PDCCH1, so that blind decoding is unnecessary. The direction as to proper MCS may be provided by the PDCCH0 message that is concurrent with the PDCCH1 presently being decoded, in which case PDCCH0 processing will generally need to be completed before PDCCH1 processing can proceed past the MRC block 612. However, the direction may instead be provided in a previous PDCCH0 message, or even in a previous PDCCH1 message (though the latter risks increased error propagation). According to this second "plural PDCCH1 MCS" alternative, the control block 618 directs the MCS selection block to initiate processing of PDCCH1 with the correct MCS, as determined either from the concurrent PDCCH0 message, or from an earlier message. In this alternative, failure of the PDCCH1 validity check at the block 638 results in a decision to ignore the data, and does not implicate a change in the MCS selection in the block 636.

A third, and simpler, alternative for processing PDCCH1 is predicated on utilizing a known MCS for PDCCH1. This is similar to the processing of PDCCH0, except that the same MCS need not necessarily be used, as long as the PDCCH1 MCS is predetermined. In this case, the PDCCH1 symbols need not be complex after the phase correction block 610, and the MCS selection block 636 may not be required for purposes of changing the MCS. Therefore, the third alternative is most readily compatible with existing MS transceivers, and with existing CDMA EV-DV system standards. The transmitter, as illustrated in FIG. 5, may have transmitted PDCCH1 at lower power, but the MS needs no special instruction in this regard. If the MS happens to be in a good reception area, it will be able to successfully decode PDCCH1, despite the fact that it is a lower power, less robust signal than on PDCCH0. If the MS is not in a good reception area, and accordingly fails to correctly decode a message on PDCCH1, such a message on PDCCH1 is simply ignored.

CONCLUSION

The foregoing description illustrates exemplary implementations, and novel features, of aspects of a method and apparatus for enhancing transmission efficiency for a plurality of packet data control channels associated with a shared packet data channel. Some alternative implementations are suggested, but it is impractical to list all alternative implementations of the method and apparatus. Therefore, the scope of the presented invention should be determined only by reference to the appended claims, and should not be limited by features illustrated in the foregoing description except insofar as such limitation is recited in an appended claim.

While the above description has pointed out novel features of the invention as applied to various embodiments, the skilled person will understand that various omissions, substitutions, and changes in the form and details of the methods and systems illustrated may be made without departing from the scope of the invention. For example, the skilled person will be able to adapt the details described herein to communications systems having a wide range of modulation techniques, transmitter and receiver architectures, and generally any number of different formats. More particularly, channel assignment is a matter of design convenience. Thus, the reference throughout to a first PDCCH, or PDCCH0, as the primary, higher power or more widely accessible PDCCH should not be construed as precluding other channels from being assigned these roles, whether on a fixed or dynamically varying basis. The nomenclature used, such as packet data control channel, is used for convenience, and is not to be taken as limiting the scope of systems that may embody the present method and apparatus.

Each practical and novel combination of the elements described hereinabove, and each practical combination of equivalents to such elements, is contemplated as an embodiment of the invention. Because many more element combinations are contemplated as embodiments of the invention than can reasonably be explicitly enumerated herein, the scope of the invention is properly defined by the appended claims rather than by the foregoing description. All variations coming within the meaning and range of equivalency of the various claim elements are embraced within the scope of the corresponding claim. Each claim set forth below is intended to encompass any system or method that differs only insubstantially from the literal language of such claim, as long as such system or method is not, in fact, an embodiment of the prior art. To this end, each described element in each claim should be construed as broadly as possible, and moreover should be understood to encompass any equivalent to such element insofar as possible without also encompassing the prior art.

What is claimed is:

1. A method of controlling power in a cellular telecommunications system that provides high-speed packet data to a multiplicity of mobile stations (MSs) from a serving base station (BS), the method comprising:
    a) evaluating an expected reception quality for a multiplicity of MSs served by a serving BS;
    b) categorizing the MSs served by the serving BS into a plurality of reception categories that reflect results of the expected reception quality evaluation;
    c) assigning a first one of a plurality of packet data control channels (PDCCHs) preferentially to MSs in a first reception category;
    d) transmitting information on the first PDCCH with a first robustness to MSs in the first reception category; and
    e) transmitting information on a different second PDCCH at a second robustness lower than the first robustness to MSs of a second reception category, such that more transmit power is attributable to the first PDCCH than to the second PDCCH.

2. The method of claim 1, wherein the plurality of PDCCHs are associated with a single sharable packet data channel.

3. The method of claim 1, wherein the lower robustness of the second PDCCH transmission is at least partly due to transmitting the second PDCCH at a lower power than the first PDCCH.

4. The method of claim 1, further including reducing robustness of the second PDCCH transmission by changing a modulating and/or coding scheme (MCS) for the second PDCCH so as to convey data more densely on the second PDCCH than on the first PDCCH.

5. The method of claim 4, further including modulating and coding symbols for the second PDCCH at a selected one of a plurality of MCS levels that are known to a target MS.

6. The method of claim 5, further comprising blind decoding a message on the second PDCCH at the target MS according to a first MCS, and blind decoding the message according to a second MCS upon failure of decoding according to the first MCS.

7. The method of claim 1, wherein the lower robustness of the second PDCCH transmission is at least partly due to time multiplexing a plurality of messages on the second PDCCH during a period concurrent with a single message transmission on the first PDCCH.

8. The method of claim 1, wherein the lower robustness of the second PDCCH transmission is at least partly due to transmitting the second PDCCH within a smaller Walsh space than the first PDCCH.

9. The method of claim 1, wherein step (a) of evaluating expected reception quality for a particular MS includes evaluating a path length between the serving BS and the particular MS.

10. The method of claim 9, further comprising estimating location parameters for the particular MS.

11. The method of claim 9, further comprising estimating propagation delay for signals between the serving BS and the particular MS.

12. The method of claim 1, wherein step (a) of evaluating expected reception quality for a particular MS includes evaluating a plurality of channel quality indications (CQIs) transmitted to the serving BS by the particular MS.

13. The method of claim 12, further comprising filtering CQIs transmitted to the serving BS by the particular MS to substantially reflect only changes in CQI that persist for about 100 ms.

14. Cellular communication system base station (BS) apparatus for transmitting high-speed data to a multiplicity of users, the apparatus comprising:
    a) packet data channel transmission facilities configured to share a packet data channel between a plurality of user transceivers by transmitting different packet data to each of a plurality of distinct user transceivers on the packet data channel during a common packet transmission period;
    b) a plurality of distinct packet control channel (PCC) signal processing paths, including a first PCC and a second PCC;
    c) a user transceiver receive evaluation block configured to estimate ability to receive signals for each of a multiplicity of user transceivers assigned to share the packet data channel, and to categorize the user transceivers in a plurality of receive ability categories according to such estimated ability to receive;
    d) processing facilities configured to prepare first and second information messages regarding the packet data channel for concurrent transmission on the first and second PCCs, respectively, to a corresponding plurality of user transceivers selected based in part according to receive ability categories of the user transceivers; and
    e) robustness control facilities for controlling a second PCC message transmission robustness distinctly from a robustness of a concurrent first PCC message transmission.

15. The BS apparatus of claim 14, wherein the robustness control facilities include a channel power control block for controlling a transmission power of the second PCC distinctly from transmission power applied to the first PCC.

16. The BS apparatus of claim 15, wherein the user transceiver receive evaluation block is configured to estimate ability to receive signals for a particular MS based upon a signal propagation delay estimate for the MS.

17. The BS apparatus of claim 15, wherein the user transceiver receive evaluation block is configured to estimate ability to receive signals for a particular MS based upon signal quality reports transmitted by the particular MS.

18. The BS apparatus of claim 15, wherein the user transceiver receive evaluation block is configured to estimate ability to receive signals for a particular MS based upon a speed estimate for the particular MS.

19. The BS apparatus of claim 14, wherein the robustness control facilities include a data density control block for controlling data density of a message transmitted on the second PCC distinctly from data density of a message transmitted concurrently on the first PCC.

20. The BS apparatus of claim 19, wherein the robustness control facilities further include a channel power control block for controlling a transmission power of the second PCC distinctly from transmission power applied to the first PCC.

* * * * *